United States Patent
Yamana et al.

(10) Patent No.: US 9,553,711 B2
(45) Date of Patent: Jan. 24, 2017

(54) BASE STATION AND CELL ASSIGNMENT METHOD

(71) Applicant: FUJITSU LIMITED, Kawasaki-shi, Kanagawa (JP)

(72) Inventors: Takeshi Yamana, Yokohama (JP); Masahiro Oosugi, Yokohama (JP); Masakazu Harada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 13/950,415

(22) Filed: Jul. 25, 2013

(65) Prior Publication Data

US 2014/0113642 A1    Apr. 24, 2014

(30) Foreign Application Priority Data

Oct. 24, 2012  (JP) ................................. 2012-235029

(51) Int. Cl.
```
H04B 7/212    (2006.01)
H04L 5/00     (2006.01)
H04W 72/04    (2009.01)
H04W 84/04    (2009.01)
```
(52) U.S. Cl.
CPC ........ *H04L 5/0069* (2013.01); *H04W 72/0486* (2013.01); *H04W 72/0453* (2013.01); *H04W 84/045* (2013.01)

(58) Field of Classification Search
USPC ........ 455/561, 415, 226, 446, 456; 370/329, 370/330
See application file for complete search history.

(56) References Cited

U.S. PATENT DOCUMENTS

| | | | | |
|---|---|---|---|---|
| 7,299,069 | B2* | 11/2007 | Claussen | ........................ 455/561 |
| 7,957,739 | B2* | 6/2011 | Jeong | .................... H04W 48/16 |
| | | | | 455/435.1 |
| 8,417,238 | B2 | 4/2013 | Jang | |
| 8,705,485 | B2* | 4/2014 | Koyanagi | ..................... 370/330 |
| 8,811,961 | B2* | 8/2014 | Lee | ....................... H04L 1/1607 |
| | | | | 370/216 |
| 8,891,464 | B2* | 11/2014 | Picker | .......................... 370/329 |
| 2010/0087150 | A1 | 4/2010 | Yamada et al. | |
| 2010/0216478 | A1 | 8/2010 | Buddhikot et al. | |

(Continued)

FOREIGN PATENT DOCUMENTS

| | | |
|---|---|---|
| EP | 2496050 A1 | 9/2012 |
| JP | 2010-268320 | 11/2010 |

(Continued)

OTHER PUBLICATIONS

"Mobile country code" https://en.wikipedia.org/w/index.php?title=Mobile_country_code&oldid=220531532. pp. 1-3. Jun. 2008.*

(Continued)

*Primary Examiner* — Vladimir Magloire
*Assistant Examiner* — Majid Syed
(74) *Attorney, Agent, or Firm* — Fujitsu Patent Center

(57) ABSTRACT

A counting unit of a base station counts the number of terminals located in an area covered by the base station for each of communication carriers corresponding to the terminals. An assigning unit assigns each of cells in a first group to any of the communication carriers, where each of the cells is a frequency band of the base station 10 and occupied by one terminal communicating with the cell.

5 Claims, 10 Drawing Sheets

| ATTRIBUTE ID | ITEM 1 | ITEM 2 | ITEM 3 (USER) | ADJUSTMENT CONTENTS | NUMBER OF CHANGES |
|---|---|---|---|---|---|
| 1 | SHOP | MOBILE PHONE SHOP | au | INCREASE FOR CARRIER B | 3 |
| 2 | TIME | 16:00 TO 21:00 | ELDERLY PERSON | INCREASE FOR CARRIER A | 2 |
| 3 | TIME | 7:00 TO 20:00 | WORKER | DECREASE FOR CARRIER C | 2 |
| 4 | SEASON | SUMMER VACATION | CHILD 1 | INCREASE FOR CARRIER B | 1 |
| 5 | EVENT | NEW YEAR'S HOLIDAYS | RELATIVE | INCREASE FOR CARRIER C | 3 |
| 6 | TIME | 22:00 TO 7:00 | STAFF IS AT HOME | DECREASE FOR CARRIER B | 3 |
| 7 | SHOP | CAFETERIA IN FUKUOKA | sbm | INCREASE FOR CARRIER C | 3 |

(56) References Cited

U.S. PATENT DOCUMENTS

| | | |
|---|---|---|
| 2011/0207461 A1 | 8/2011 | Lundqvist et al. |
| 2012/0083232 A1* | 4/2012 | Kenington et al. ........ 455/226.1 |
| 2012/0329470 A1 | 12/2012 | Nakamura |
| 2013/0303114 A1* | 11/2013 | Ahmad .................. H04W 4/26 455/406 |
| 2014/0155081 A1* | 6/2014 | Nuss .................... H04W 28/08 455/453 |

FOREIGN PATENT DOCUMENTS

| | | |
|---|---|---|
| JP | 2011-182214 | 9/2011 |
| JP | 2012-502521 | 1/2012 |
| JP | 2012-518927 | 8/2012 |
| WO | 2008/096707 A1 | 8/2008 |
| WO | 2010028702 | 3/2010 |
| WO | WO-2011/099623 A1 | 8/2011 |

OTHER PUBLICATIONS

Extended European Search Report dated Feb. 13, 2014 for corresponding European Application No. 13179449.7.
JPOA—Japanese Office Action issued for Japanese Patent Application No. 2012-235029 mailed on May 10, 2016, with partial English translation.
EPOA—European Office Action issued on Sep. 28, 2016 for European Patent Application No. 13179449.7.
JPOA—Japanese Office Action issued on Aug. 9, 2016 for Japanese Patent Application No. 2012-235029, with partial English translation.

\* cited by examiner

| CELL SERIAL NUMBER | MCC NUMBER | MNC NUMBER | ECI NUMBER | CARRIER | ECGI NUMBER |
|---|---|---|---|---|---|
| 1 | 01 | 01 | 01 | A | 010101 |
| 2 | 01 | 02 | 02 | B | 010202 |
| 3 | 01 | 03 | 03 | C | 010303 |
| 4 | 01 | 01 | 04 | A | 010104 |
| 5 | 01 | 02 | 05 | B | 010205 |
| 6 | 01 | 01 | 06 | A | 010106 |
| 7 | 01 | 01 | 07 | A | 010107 |
| 8 | 01 | 03 | 08 | C | 010308 |
| 9 | 01 | XX | 09 | UNDESIGNATED | UNDESIGNATED |

| MCC NUMBER | MNC NUMBER | CARRIER | MME |
|---|---|---|---|
| 440 | 1 | A | 192.168.10.10 |
| 440 | 2 | B | 192.168.20.10 |
| 440 | 3 | C | 192.168.30.10 |
| 440 | 4 | D | 192.168.40.10 |
| 440 | 5 | E | 192.168.50.10 |
| 440 | 6 | F | 192.168.60.10 |

FIG.5

| CELL SERIAL NUMBER | MCC NUMBER | MNC NUMBER | ECI NUMBER | CARRIER | ECGI NUMBER |
|---|---|---|---|---|---|
| 1 | 01 | 01 | 01 | A | 010101 |
| 2 | 01 | 01 | 02 | A | 010102 |
| 3 | 01 | 01 | 03 | A | 010103 |
| 4 | 01 | 01 | 04 | A | 010104 |
| 5 | 01 | 01 | 05 | A | 010105 |
| 6 | 01 | 01 | 06 | A | 010106 |
| 7 | 01 | 02 | 07 | B | 010207 |
| 8 | 01 | 03 | 08 | C | 010308 |
| 9 | 01 | XX | 09 | UNDESIGNATED | UNDESIGNATED |

FIG.6

| CELL SERIAL NUMBER | MCC NUMBER | MNC NUMBER | ECI NUMBER | CARRIER | ECGI NUMBER |
|---|---|---|---|---|---|
| 1 | 01 | 01 | 01 | A | 010101 |
| 2 | 01 | 01 | 02 | A | 010102 |
| 3 | 01 | 01 | 03 | A | 010103 |
| 4 | 01 | 01 | 04 | A | 010104 |
| 5 | 01 | 01 | 05 | A | 010105 |
| 6 | 01 | 01 | 06 | A | 010106 |
| 7 | 01 | XX | 07 | UNDESIGNATED | UNDESIGNATED |
| 8 | 01 | XX | 08 | UNDESIGNATED | UNDESIGNATED |
| 9 | 01 | XX | 09 | UNDESIGNATED | UNDESIGNATED |

FIG.8

| CELL SERIAL NUMBER | MCC NUMBER | MNC NUMBER | ECI NUMBER | CARRIER | ECGI NUMBER | PRIORITY IMSI |
|---|---|---|---|---|---|---|
| 1 | 01 | 01 | 01 | A | 010101 | IMSI-A |
| 2 | 01 | 02 | 02 | B | 010202 | - |
| 3 | 01 | 03 | 03 | C | 010303 | - |
| 4 | 01 | 01 | 04 | A | 010104 | - |
| 5 | 01 | 02 | 05 | B | 010205 | - |
| 6 | 01 | 01 | 06 | A | 010106 | - |
| 7 | 01 | 01 | 07 | A | 010107 | - |
| 8 | 01 | 03 | 08 | C | 010308 | - |
| 9 | 01 | XX | 09 | UNDESIGNATED | UNDESIGNATED | - |

FIG.10

| ATTRIBUTE ID | ITEM 1 | ITEM 2 | ITEM 3 (USER) | ADJUSTMENT CONTENTS | NUMBER OF CHANGES |
|---|---|---|---|---|---|
| 1 | SHOP | MOBILE PHONE SHOP | au | INCREASE FOR CARRIER B | 3 |
| 2 | TIME | 16:00 TO 21:00 | ELDERLY PERSON | INCREASE FOR CARRIER A | 2 |
| 3 | TIME | 7:00 TO 20:00 | WORKER | DECREASE FOR CARRIER C | 2 |
| 4 | SEASON | SUMMER VACATION | CHILD 1 | INCREASE FOR CARRIER B | 1 |
| 5 | EVENT | NEW YEAR'S HOLIDAYS | RELATIVE | INCREASE FOR CARRIER C | 3 |
| 6 | TIME | 22:00 TO 7:00 | STAFF IS AT HOME | DECREASE FOR CARRIER B | 3 |
| 7 | SHOP | CAFETERIA IN FUKUOKA | sbm | INCREASE FOR CARRIER C | 3 |

| CARRIER | PRIORITY OF CARRIERS |
|---|---|
| A | 2 |
| B | 1 |
| C | 3 |
| D | 4 |

…

BASE STATION AND CELL ASSIGNMENT METHOD

CROSS-REFERENCE TO RELATED APPLICATION(S)

This application is based upon and claims the benefit of priority of the prior Japanese Patent Application No. 2012-235029, filed on Oct. 24, 2012, the entire contents of which are incorporated herein by reference.

FIELD

The embodiments discussed herein are directed to a base station, a terminal, and a cell assignment method.

BACKGROUND

In some cases, a 3GPP LTE (3rd Generation Partnership Project Radio Access Network Long Term Evolution) system includes a femto (Femto) base station (hereinafter, may be referred to as a "femto station"). The femto station is smaller in size than a macro base station and installed in, for example, home or office.

At present, the femto base station differs for each communication carrier. Therefore, in an area where a plurality of users having communication terminals using different communication carriers come and go (for example, an office or a restaurant), femto stations corresponding to respective communication carriers are installed in order to cope with communication terminals of all the communication carriers. Consequently, burden on a person who installs the femto stations increases.

Patent Document 1: Japanese National Publication of International Patent Application No. 2012-502521

Meanwhile, it may be possible to introduce a femto station that can be shared by a plurality of communication terminals using different communication carriers. In this case, one of the communication carriers is assigned to each "cell" of the femto station. The "cell" is a unit of a frequency band that a single terminal performing communication can occupy.

However, if cells are simply assigned to a plurality of communication carriers, for example, excess cells may be assigned to a communication carrier that has a small number of communication terminals. In this case, the use efficiency of the cell is reduced.

SUMMARY

According to an aspect of an embodiment, a base station includes a counting unit that counts number of terminals located in an area covered by the base station, for each of communication carriers corresponding to the terminals; and an assigning unit that assigns each of cells in a first group to any of the communication carriers, wherein each of the cells is a frequency band of the base station and occupied by one terminal communicating with the cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of the carrier assignment table according to the first embodiment;

FIG. 6 is a diagram illustrating another example of the carrier assignment table according to the first embodiment;

FIG. 8 is a diagram illustrating still another example of the carrier assignment table according to the first embodiment;

FIG. 10 is a diagram illustrating an example of an adjustment table according to the second embodiment;

DESCRIPTION OF EMBODIMENTS

Figures 1, 2:
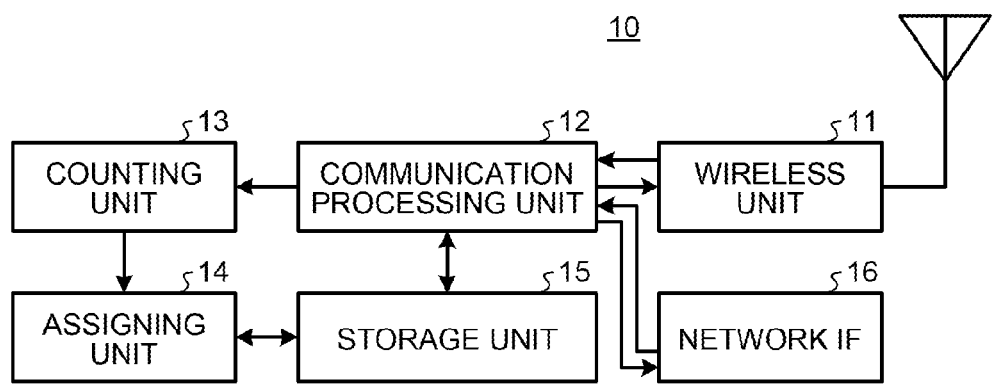
FIG. 1 is a block diagram illustrating an example of a base station according to a first embodiment.
FIG. 2 is a diagram illustrating an example of a carrier assignment table according to the first embodiment.

Preferred embodiments of the present invention will be explained with reference to accompanying drawings. The base station, the terminal, and the cell assignment method disclosed in the present application are not limited to the embodiments. The components having the same functions in the embodiments are denoted by the same reference numerals and symbols, and the same explanation will not be repeated.

[a] First Embodiment

Configuration of a Base Station

FIG. 1 is a block diagram illustrating an example of a base station according to a first embodiment. In FIG. 1, a base station 10 includes a wireless unit 11, a communication processing unit 12, a counting unit 13, an assigning unit 14, a storage unit 15, and a network interface (IF) 16.

The wireless unit 11 receives a signal transmitted by a terminal located in an area covered by the base station 10 via an antenna, and performs a certain wireless reception process on the received signal. The certain wireless reception process is, for example, down conversion, analog-to-digital conversion, or the like. The received signal subjected to the wireless reception process is output to the communication processing unit 12.

The wireless unit 11 receives a transmission signal from the communication processing unit 12, and performs a predetermined wireless transmission process on the transmission signal. The certain wireless transmission process is, for example, digital-to-analog conversion, up conversion, or the like.

The communication processing unit 12 outputs a notification signal containing identification information on a carrier corresponding to the base station 10 to the wireless unit 11 when the base station 10 is activated. Therefore, the notification signal is transmitted to a terminal located in the area covered by the base station 10 via the wireless unit 11 and the antenna.

The communication processing unit 12 outputs a pseudo paging signal to the wireless unit 11 with a certain period. Therefore, the pseudo paging signal is transmitted to the terminal located in the area covered by the base station 10 via the wireless unit 11 and the antenna.

The communication processing unit 12 extracts a control signal from a received signal received from the wireless unit 11, and outputs the extracted control signal to the counting unit 13. Specifically, the extracted control signal is a tracking area registration request signal (TAU: Tracking Area Update) transmitted by the terminal in response to the notification signal containing the identification information on a carrier and is a response signal transmitted by the terminal in response to a pseudo paging signal transmitted by the base station 10.

The communication processing unit 12 assigns a use cell to a terminal as an assigning target on the basis of a "carrier assignment table" stored in the storage unit 15, identification information on the terminal as the assigning target, and identification information on a communication carrier corresponding to the terminal. The information on the use cell, that is, an assignment signal, is transmitted to the terminal as the assigning target. In the "carrier assignment table", pieces of identification information on a plurality of cells of the base station 10 and pieces of identification information on communication carriers are stored in an associated manner. Details of the "carrier assignment table" will be explained later.

The communication processing unit 12 performs a process for transferring a received signal. Specifically, when a signal is received in an arbitrary use cell, the communication processing unit 12 specifies a communication carrier associated with the arbitrary use cell in the carrier assignment table. The communication processing unit 12 sends the received signal to a core network associated with the specified communication carrier in a "correspondence table" via the network IF 16. In the "correspondence table", pieces of identification information on a plurality of communication carriers and pieces of information on core networks corresponding to the respective communication carriers are stored in an associated manner. Details of the "correspondence table" will be explained later.

The counting unit 13 counts the number of terminals located in the area covered by the base station 10 for each of the communication carriers corresponding to the terminals. The number is counted by using the TAU and the response signal as described above. The TAU is transmitted by the terminals when the base station 10 is activated. The response signal is transmitted by the terminals with a certain period. Namely, the counting unit 13 performs a counting process at the time of activation of the base station 10 and with a certain period.

The assigning unit 14 assigns each of cells in a first group to any of communication carriers, where each of the cells is a frequency band of the base station 10 and to be occupied by one terminal communicating with the cell. The cell is assigned to the communication carrier based on a ratio of the number that the counting unit 13 has counted for each of the communication carriers. It may be possible to set a lower limit of the number of the cells to be assigned to each of the communication carriers. For example, it may be possible to assign at least one cell to a communication carrier even when no cell is assigned to the communication carrier based on the ratio.

The assigning unit 14 generates the carrier assignment table, in which pieces of identification information on the cells in the first group and pieces of identification information on communication carriers corresponding to the respective cells in the first group are associated with one another, and stores the carrier assignment table in the storage unit 15. The assigning unit 14 may include, in the carrier assignment table, identification information on a cell in a second group that is available to all of the communication carriers. In the following, the cell in the second group may be referred to as a "shared cell".

The storage unit 15 stores therein the carrier assignment table generated by the assigning unit 14.

FIG. 2 is a diagram illustrating an example of the carrier assignment table according to the first embodiment. In FIG. 2, the carrier assignment table contains, as items, a cell serial number, an MCC number, an MNC number, an ECI number, a carrier, and an ECGI number. The cell serial number indicates the number of cells of the base station 10. Specifically, according to the carrier assignment table in FIG. 2, the base station 10 has nine cells. The MCC number is a mobile country code (Mobile Country Code), that is, a country number. The MNC (Mobile Network Code) number is an identification number on a communication carrier in each country. Specifically, a combination of the MCC number and the MNC number serves as communication carrier identification information that enables to distinguish between communication carriers in the world. The ECI (E-UTRAN Cell ID) number is identification information on a cell. In the item of the carrier, a carrier name is input. The ECGI number is a digit string in which the MCC number, the MNC number, and the ECI number are simply combined.

Basically, as described above, it is sufficient that the carrier assignment table stores pieces of identification information on a plurality of cells of the base station 10 and pieces of identification information on communication carriers in an associated manner. Therefore, it is sufficient that the MCC number, the MNC number, and the ECI number are contained, and other items, that is, containing of the cell serial number, the carrier, and the ECGI number may be omitted.

In FIG. 2, a cell with the ECI number of 09 is a cell belonging to the second group as described above and is available to all of the communication carriers.

The network IF 16 is connected to a plurality of core networks, each corresponding to each of the communication carriers. The network IF 16 sends a signal received from the communication processing unit 12 to a core network associated with the communication carrier specified by the communication processing unit 12 in the correspondence table.

Figures 3, 4:
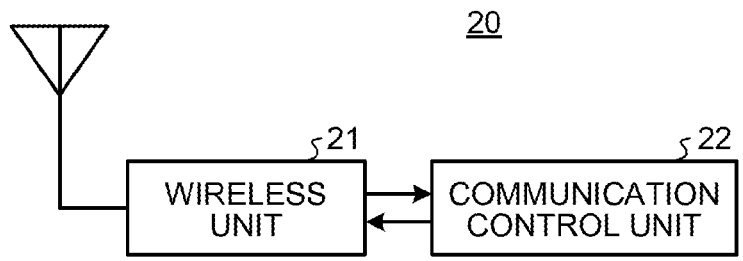
FIG. 3 is a diagram illustrating an example of a correspondence table according to the first embodiment.
FIG. 4 is a block diagram illustrating an example of a terminal according to the first embodiment.

FIG. 3 is a diagram illustrating an example of the correspondence table according to the first embodiment. In FIG. 3, the correspondence table contains, as items, the MCC number, the MNC number, the carrier, and an MME (Mobility Management Entity) number. The MME number is used as identification information on a core network.

Basically, as described above, it is sufficient that the correspondence table stores pieces of identification information on a plurality of communication carriers and pieces of information on core networks corresponding to the respective communication carriers in an associated manner. Therefore, it is sufficient that the MCC number, the MNC number, and the MME number are contained, and containing of an item of the carrier may be omitted.

Configuration of the Terminal

FIG. 4 is a block diagram illustrating an example of the terminal according to the first embodiment. In FIG. 4, a terminal 20 includes a wireless unit 21 and a communication control unit 22.

The wireless unit 21 receives a signal transmitted by the base station 10 via an antenna, and performs a certain wireless reception process on the received signal. The received signal subjected to the wireless reception process is output to the communication control unit 22.

The wireless unit 21 performs a certain wireless transmission process on a signal received from the communication control unit 22, and transmits the signal subjected to the wireless transmission process to the base station 10 via the antenna.

When receiving a notification signal containing the identification information on a carrier corresponding to the base station 10 at the time of activation of the base station 10, the communication control unit 22 generates a TAU and transmits the generated TAU to the base station 10 via the wireless unit 21 and the antenna.

When receiving a pseudo paging signal from the base station 10 with a certain period, the communication control unit 22 transmits a response signal to the base station 10 in response to the pseudo paging signal.

When a transmission data signal is generated, the communication control unit 22 transmits the transmission data signal to the base station 10 by using a use cell indicated by the assignment signal received from the base station 10. The communication control unit 22 receives a data signal from the base station 10 by using the use cell indicated by the assignment signal received from the base station 10. Namely, the communication control unit 22 performs communication by using the use cell indicated by the assignment signal.

The use cell indicated by the assignment signal is a cell that the base station 10 has assigned to a communication carrier corresponding to the terminal 20 based on a ratio of the number of terminals of each of the communication carriers corresponding to the terminals located in the area covered by the base station 10.

Operations of the Base Station and the Terminal

Processing operations of the base station 10 and the terminal 20 configured as above will be explained.

Initial Setting of the Carrier Assignment Table

The base station 10 transmits a notification signal containing the identification information on a carrier corresponding to the base station 10 at the time of activation.

The terminal 20 located in the area covered by the base station 10 transmits a TAU to the base station 10 by using a "base cell" of a communication carrier corresponding to the terminal 20. At the time of activation of the base station 10, the base cell that is provisionally assigned to each of the communication carriers in advance is used. For example, cells with cell serial numbers 1, 2, and 3 are assigned, as the base cells, to communication carriers A, B, and C, respectively. Therefore, the terminal 20 of the communication carrier A transmits a TAU by using the base cell with the cell serial number 1.

Subsequently, the base station 10 counts the number of the received TAUs for each of the base cells. Because the base cells correspond to the respective communication carriers, it is possible to count the number of the terminals 20 controlled by the base station 10 for each of the communication carriers by counting the number of the TAUs received by each of the base cells. Incidentally, in a known system, each frame of one cell includes a plurality of subframes; therefore, the base station 10 can receive TAUs from a plurality of the terminals 20 by one cell by using a plurality of the subframes.

Subsequently, the base station 10 assigns each of the cells in the first group to any of the communication carriers, where each of the cells is a frequency band of the base station 10 and to be occupied by one terminal communicating with the cell. The cell is assigned to the communication carrier based on a ratio of the number that the counting unit 13 has counted for each of the communication carriers.

It may be possible to set a lower limit of the number of the cells to be assigned to each of the communication carriers. It may also be possible to employ, as a shared cell, a cell remaining after cells are assigned to the communication carriers based on the ratio. Specifically, as illustrated in FIG. 5, even when no cell is assigned to each of the communication carriers B and C based on the ratio, cells with cell serial numbers 7 and 8 are assigned to the communication carriers B and C, respectively. In addition, a cell with a cell serial number 9, which is a remaining cell, is employed as a shared cell. FIG. 5 is a diagram illustrating an example of the carrier assignment table according to the first embodiment.

the cells with the cell serial numbers 7 and 8 respectively assigned to the communication carriers B and C in FIG. 5 may be employed as shared cells as illustrated in FIG. 6. FIG. 6 is a diagram illustrating another example of the carrier assignment table according to the first embodiment.

Periodic update of the carrier assignment table

Figure 7:
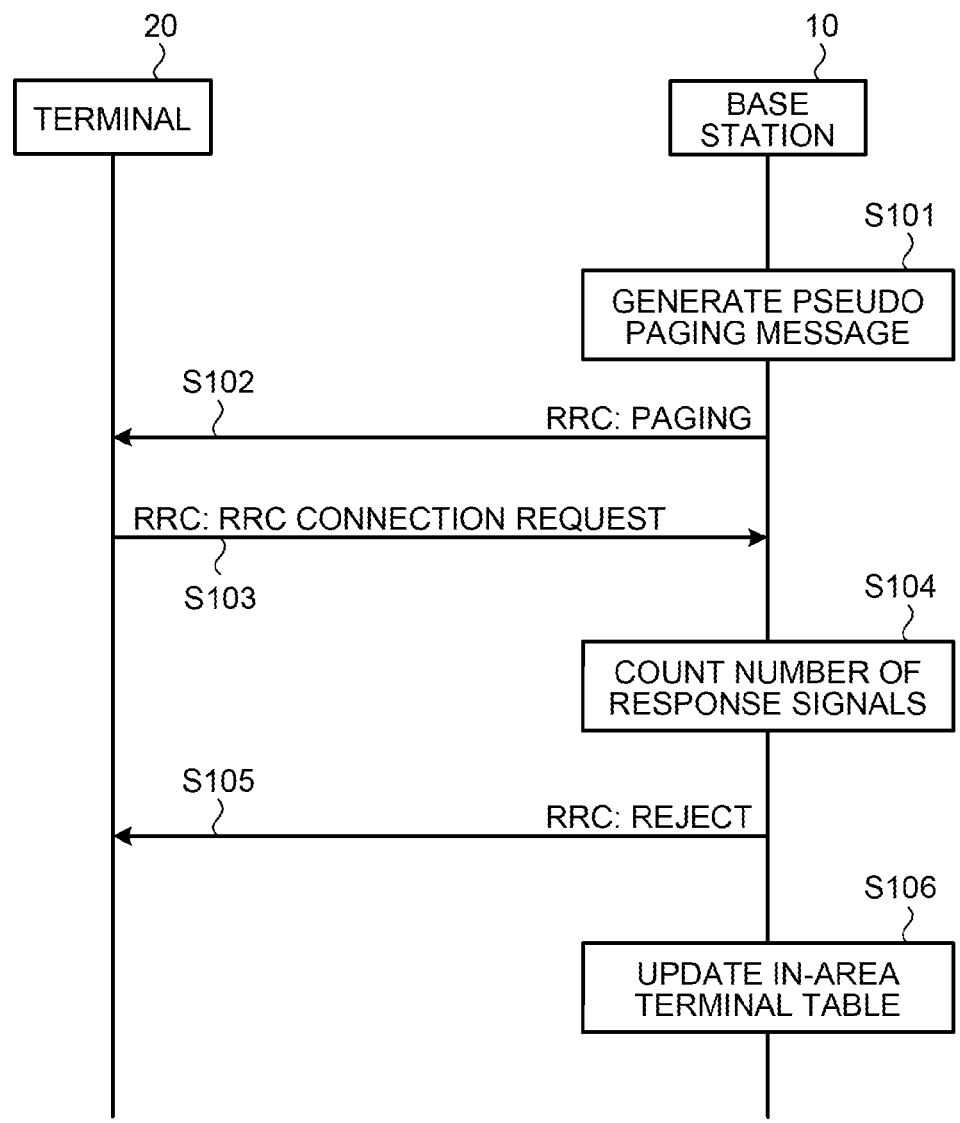
FIG. 7 is a diagram for explaining periodic update of the carrier assignment table according to the first embodiment.

FIG. 7 is a diagram for explaining periodic update of the carrier assignment table according to the first embodiment. FIG. 7 illustrates a process that is performed at the end of one period. Namely, the process illustrated in FIG. 7 is performed for each period.

The base station 10 generates a pseudo paging message, that is, a pseudo paging signal, with a certain period (Step S101).

The base station 10 transmits the pseudo paging signal to the terminal 20 stored in an "in-area terminal table" with a certain period (Step S102). The in-area terminal table is stored in the storage unit 15. In the in-area terminal table, identification information on the terminal 20 that has transmitted the TAU is stored by the communication processing unit 12. The terminal 20 that newly enters the area of the base station 10 transmits a TAU to the base station 10 at the time of entrance.

Subsequently, the terminal 20 that has received the pseudo paging signal transmits an RRC connection request (RRC CONNECTION REQUEST) as a response signal in response to the pseudo paging signal to the base station 10 (Step S103).

The base station 10 counts the number of the received response signals for each of the communication carriers (Step S104). The base station 10 assigns each of the cells in the first group to any of the communication carriers, where each of the cells is a frequency band of the base station 10 and occupied by on terminal communicating with the cell. The cell is assigned to the communication carrier based on a ratio of the number that the counting unit 13 has counted for each of the communication carriers.

Subsequently, the base station 10 transmits an RRC reject (Reject) to the terminal 20 that has transmitted the RRC connection request (Step S105).

The base station 10 deletes the identification information on the terminal 20 that has not transmitted the response signal from the in-area terminal table, to thereby update the in-area terminal table (Step S106). This is because it is possible to determine that the terminal 20 that has not transmitted the response signal even when the pseudo paging signal is transmitted has exited the area of the base station 10.

It may be possible to set a lower limit of the number of the cells to be assigned to each of the communication carries even in a periodic update process, similarly to the initial setting (see FIG. 5). It may also be possible to employ, as a shared cell, a cell remaining after cells are assigned to the communication carriers based on the ratio (see FIG. 6). Alternatively, it may be possible to assign the cells with the cell serial numbers 7 and 8 respectively assigned to the communication carriers B and C in FIG. 5 as shared cells as illustrated in FIG. 6.

As described above, according to the first embodiment, in the base station 10, the counting unit 13 counts the number of terminals located in an area covered by the base station for each of the communication carriers corresponding to the terminals. Furthermore, the assigning unit 14 assigns each of the cells in the first group to any of the communication carriers based on the number counted for each of the communication carriers. Each of the cells in the first group is a frequency band of the base station 10 and occupied by one terminal communicating with the cell.

With this configuration, it becomes possible to cause a single base station to cope with a plurality of communication carriers, enabling to improve the convenience of users. Furthermore, because cells are assigned to communication carriers based on the number counted for each of the communication carriers, it is possible to assign cells in accordance with the actual condition in the area covered by the base station 10. Therefore, it is possible to improve use efficiency of the cells.

Moreover, it may be possible to provide a cell in the second group that is available to all of the communication carriers, that is, a shared cell, in addition to the cells in the first group.

With this configuration, even when the number of terminals that actually have necessity of using use cells of a certain communication carrier exceeds the number of assigned cells, the shared cell can be used. Therefore, it becomes possible to reduce a wait time of a terminal that has necessity of starting communication.

Furthermore, it may be possible to set a lower limit of the number of the cells to be assigned to each of the communication carriers.

With this configuration, it becomes possible to reduce the probability that the number of terminals that actually have necessity of using use cells exceeds the number of assigned cells even for a communication carrier having a small number of terminals. Therefore, it becomes possible to reduce a wait time of a terminal that has necessity of starting communication even for a communication carrier having a small number of terminals.

Moreover, the counting unit 13 counts the number of terminals based on a tracking area registration request signal (TAU) transmitted by each of terminals or based on a response from each of the terminals in response to the pseudo paging signal transmitted by the base station 10.

Furthermore, in the terminal 20, the wireless unit 21 receives the assignment signal from the base station 10. The communication control unit 22 performs communication by using a cell indicated by the received assignment signal. The cell indicated by the assignment signal is a cell that the base station 10 has assigned to a communication carrier corresponding to the terminal 20. The base station 10 assigns a cell based on the number of terminals of each of the communication carriers corresponding to the terminals located in the area covered by the base station 10.

The carrier assignment table may contain a "priority cell" that is determined in advance as a cell to be assigned to a specific terminal 20. FIG. 8 is a diagram illustrating an example of the carrier assignment table according to the first embodiment. In FIG. 8, the cell with the cell serial number 1 is a priority cell for a certain terminal 20 of the communication carrier A. In this case, cells other than the priority cell forms the first group as described above, and a cell that remains after assignment based on the ratio is employed as a shared cell.

[b] Second Embodiment

A second embodiment relates to a process for adjusting cells assigned based on the ratio.

Configuration of a Base Station

Figure 9:
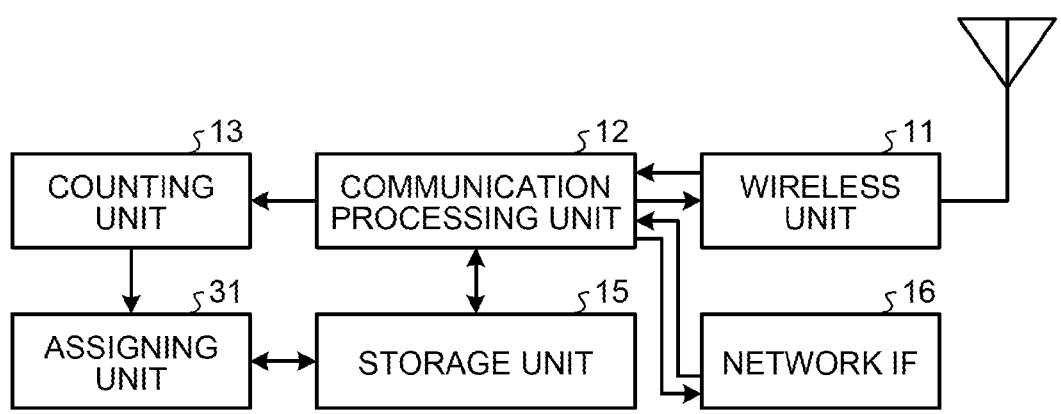
FIG. 9 is a block diagram illustrating an example of a base station according to a second embodiment.

FIG. 9 is a block diagram illustrating an example of a base station according to the second embodiment. In FIG. 9, a base station 30 includes an assigning unit 31.

The assigning unit 31 has the same functions as those of the assigning unit 14 of the base station 10 of the first embodiment. In addition, the assigning unit 31 adjusts the number of cells assigned to each of the communication carriers based on an installation location of the base station 30 or a time/season. The adjustment is performed based on an "adjustment table" stored in the storage unit 15.

FIG. 10 is a diagram illustrating an example of the adjustment table according to the second embodiment. In FIG. 10, the adjustment table contains, as items, an attribute ID, items 1, 2, and 3, adjustment contents, and the number of changes. The attribute ID corresponds to each of adjustment processes. The item 1 indicates the attribute of an adjustment process, such as an installation location of the base station 30 or a time/season. Specifically, in FIG. 10, shop indicates the installation location, and time, season, and event indicates the time/season. The item 2 indicates detailed contents of the item 1. The item 3 is used as a remarks column. The item of the adjustment contents indicates in what communication carrier the number of cells is increased or decreased. The number of changes indicates the amount of increase or decrease for the item of the adjustment contents.

Figures 11, 12:
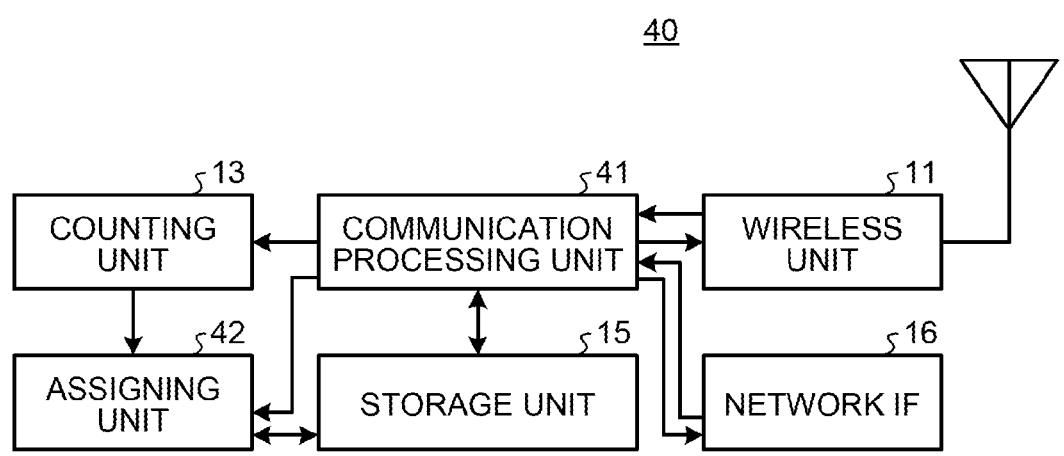
FIG. 11 is a diagram illustrating an example of a priority table according to the second embodiment.
FIG. 12 is a block diagram illustrating an example of a base station according to a third embodiment.

The assigning unit 31 may further adjust the number of cells based on the order of priority of the communication carriers. The adjustment of the number of cells based on the order of priority is performed based on a "priority table" stored in the storage unit 15. FIG. 11 is a diagram illustrating an example of the priority table according to the second embodiment. As illustrated in FIG. 11, in the priority table, a plurality of communication carriers and the order of priority of the communication carriers are associated with each other.

Specifically, to increase the number of cells assigned to a first communication carrier among a plurality of the communication carriers, the assigning unit 31 preferentially assigns, to the first communication carrier, a cell that has been assigned to a communication carrier with lower priority than that of the first communication carrier in the priority table.

Operations of the Base Station

Processing operations of the base station 30 configured as above will be explained. Two concrete examples will be explained below.

First Example

In a first example, an adjustment process on the attribute ID 1 in the adjustment table in FIG. 10 will be explained.

As a first process, because the base station 30 is installed in a mobile phone shop, the base station 30 starts an adjustment process to increase the number of cells of the communication carrier B by three at the time of activation.

As a second process, the base station 30 determines whether a shared cell is contained in the carrier assignment table.

As a third process, when the shared cell is contained, the base station 30 assigns the shared cell to the communication carrier B.

As a fourth process, when the shared cell is not contained, the base station 30 assigns a cell of a communication carrier with lower priority than that of the communication carrier B to the communication carrier B. For example, because the priority of the communication carrier C is lower than that of the communication carrier B, a cell with the cell serial number 3 assigned to the communication carrier C is assigned to the communication carrier B. It may be possible to sequentially assign cells of the communication carriers in ascending order of priority. It may be possible to exclude a cell being used for communication from a target to be assigned and preferentially assign a cell that is not being used for communication.

The second to the fourth processes are repeated until "the number of changes" is reached.

Second Example

In a second example, an adjustment process on the attribute ID 3 in the adjustment table in FIG. 10 will be explained.

As a first process, if an assignment process is performed during a period of "7:00 to 20:00" as set in the item 2, the base station 30 starts an adjustment process to decrease the number of cells of the communication carrier C by two.

As a second process, the base station 30 searches the carrier assignment table for a cell assigned to the communication carrier C that is a target of reduction.

As a third process, when there is no cell of the communication carrier C, the base station 30 terminates the adjustment process.

As a fourth process, when detecting a cell of the communication carrier C, the base station changes the cell to a shared cell.

The second to the fourth processes are repeated until no cell of the communication carrier C is detected or until "the number of changes" is reached.

As described above, according to the second embodiment, in the base station 30, the assigning unit 31 adjusts the number of cells assigned to each of the communication carriers based on an installation location of the base station 30 or a time/season.

With this configuration, it becomes possible to assign cells in consideration of the installation location of the base station 30 or the time/season. Therefore, it is possible to improve the convenience of users.

Furthermore, the order of priority is assigned to each of the communication carriers. When the assigning unit 31 performs adjustment to increase the number of cells assigned to the first communication carrier among a plurality of communication carriers, a cell that has been assigned to a communication carrier with lower priority than that of the first communication carrier is preferentially assigned to the first communication carrier.

With this configuration, it is possible to assign cells in accordance with the order of priority assigned to each of the communication carriers.

[c] Third Embodiment

A third embodiment relates to a limitation on assignment of cells.

FIG. 12 is a block diagram illustrating an example of a base station according to the third embodiment. In FIG. 12, a base station 40 includes a communication processing unit 41 and an assigning unit 42.

The communication processing unit 41 has the same functions as those of the communication processing unit 12 of the base station 10 of the first embodiment.

In addition, the communication processing unit 41 calculates a throughput value of each of the communication carriers of the base station 40, and outputs the calculated throughput values to the assigning unit 42.

The assigning unit 42 has the same functions as those of the assigning unit 14 of the base station 10 of the first embodiment.

In addition, the assigning unit 42 sets a limitation on assignment of cells to an arbitrary communication carrier when a second number of cells assigned at this time is greater than a first number of cells assigned at a previous time and when a certain condition is satisfied. Specifically, when the throughput value of an arbitrary communication carrier is equal to or greater than a certain value, the assigning unit 42 maintains the first number of cells that are assigned to the arbitrary communication carrier at a previous time, without assigning the second number of cells at this time. On the other hand, when the throughput value of the arbitrary communication carrier is smaller than the certain value, the assigning unit 42 assigns the second number of cells at this time to the arbitrary communication carrier.

In the above explanation, the throughput value of each of the communication carriers of the base station 40 is used. However, the present embodiment is not limited to this example. It may be possible to use a cumulative number of packets of each of the communication carriers of the base station 40 in a certain period.

As described above, according to the third embodiment, in the base station 40, counting by the counting unit 13 and assignment by the assigning unit 42 are performed with a certain period. The assigning unit 42 sets a limitation on assignment of cells to an arbitrary communication carrier when the second number of cells assigned at the current assignment is greater than the first number of the cells assigned at the previous assignment and when a certain condition is satisfied. Specifically, when the throughput value of an arbitrary communication carrier or a cumulative number of packets of the arbitrary communication carrier in a certain period is equal to or greater than a certain value, the assigning unit 42 maintains the first number of cells assigned at the previous time without assigning the second number of cells at this time with respect to the arbitrary communication carrier. On the other hand, when the throughput value of the arbitrary communication carrier or the cumulative number of packets of the arbitrary communication carrier in a certain period is smaller than the certain value, the assigning unit 42 assigns the second number of cells at this time to the current arbitrary communication carrier.

With this configuration, it becomes possible to assign cells in consideration of usage of resources of the base station 40 by the communication carriers. Therefore, it becomes possible to ensure fairness of the communication carriers.

[d] Fourth Embodiment

A fourth embodiment relates to a concrete example of a transfer process performed by the base station. In particular, the concrete example will be explained with an example of the flow for establishing an RRC Connection (Radio Resource Control Connection).

Figure 13:
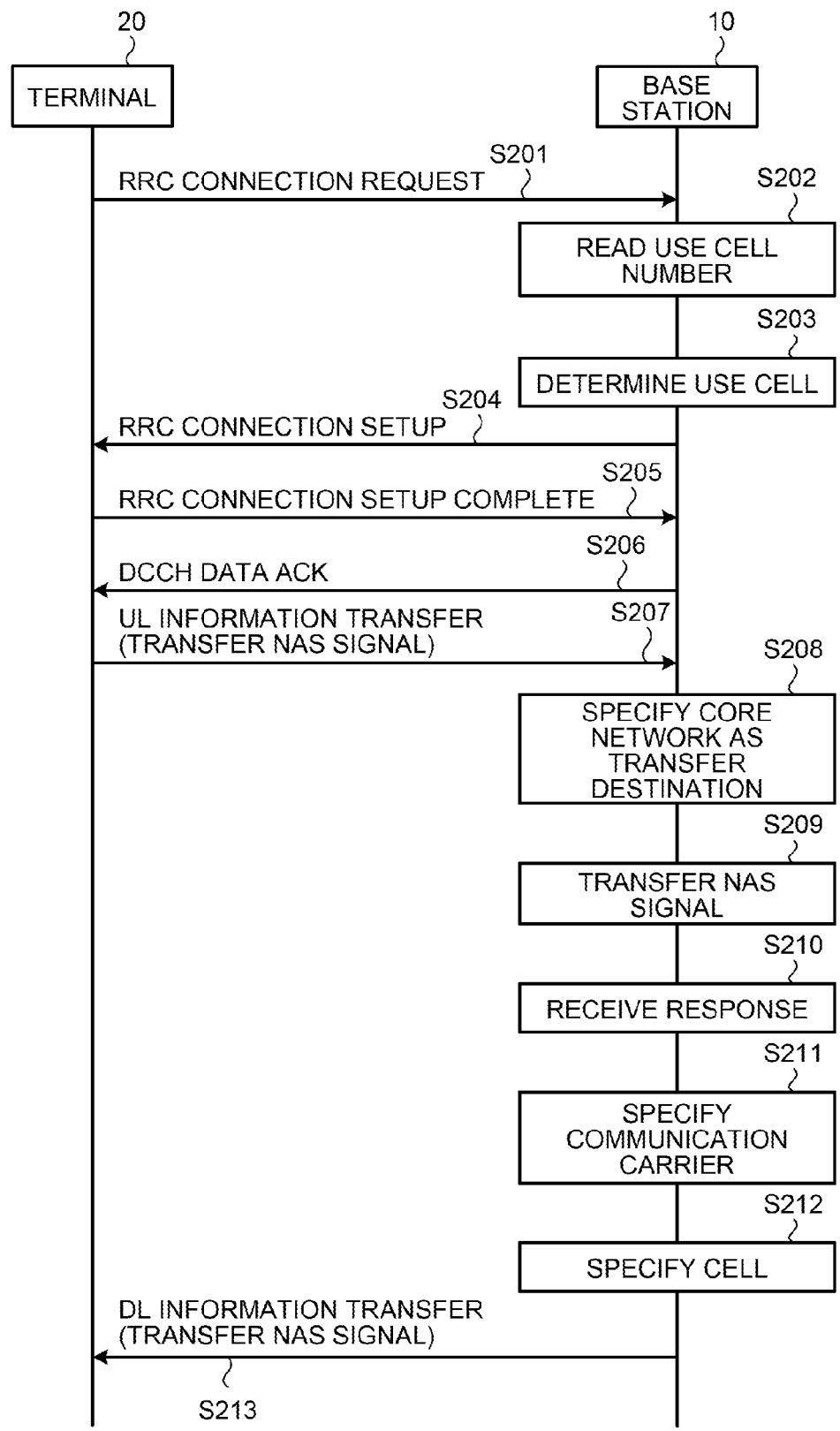
FIG. 13 is a diagram for explaining the flow for establishing an RRC connection according to a fourth embodiment.

FIG. 13 is a diagram for explaining the flow for establishing the RRC connection according to the fourth embodiment.

The terminal 20 transmits an RRC connection request (RRC Connection request) to the base station 10 (Step S201).

The communication processing unit 12 of the base station 10 reads identification information (for example, the ECGI number) on a use cell of the terminal 20 (Step S202).

The communication processing unit 12 determines the use cell of the terminal 20 (Step S203). Specifically, when a cell assigned to a communication carrier corresponding to the read ECGI number is contained in the carrier assignment table, the communication processing unit 12 determines the cell as the use cell of the terminal 20. On the other hand, when the cell assigned to the communication carrier corresponding to the read ECGI number is not contained in the carrier assignment table, the communication processing unit 12 determines a shared cell as the use cell of the terminal 20. When the shared cell is also not contained in the carrier assignment table, the communication processing unit 12 transmits an RRC connection reject (RRC Connection reject) to the terminal 20.

The communication processing unit 12 transmits an RRC connection setup (RRC Connection Setup) to the terminal 20 by using the determined use cell (Step S204).

When receiving the RRC connection setup, the terminal 20 transmits an RRC connection setup complete (RRC Connection Setup Complete) to the base station 10 (Step S205).

When receiving the RRC connection setup complete, the communication processing unit 12 of the base station 10 transmits DCCH (Dedicated Control CHannel) data ACK to the terminal 20 (Step S206).

The terminal 20 transmits a control signal (NAS signal) between the terminal and the core network to the base station 10 (Step S207).

The communication processing unit 12 of the base station 10 specifies a core network as a transfer destination based on the cell that has received the NAS signal, based on the carrier assignment table, and based on the correspondence table (Step S208).

The communication processing unit 12 transfers the NAS signal to the core network specified as the transfer destination (Step S209).

The communication processing unit 12 receives a response signal transmitted by the communication carrier in response to the transferred NAS signal (Step S210).

The communication processing unit 12 specifies a communication carrier as a transmission source of the response signal based on a transmission source address of the received response signal and based on the correspondence table (Step S211).

The communication processing unit 12 specifies a use cell based on the specified communication carrier and the carrier assignment table (Step S212).

The communication processing unit 12 transfers a response signal to the terminal 20 by using the specified use cell (Step S213).

As described above, with the transfer process performed by the communication processing unit 12, it becomes possible to execute the flow for establishing the RRC connection.

[e] Other Embodiments

First Other Embodiment

The base stations and the terminals of the first to the fourth embodiments may be realized by a hardware configuration as described below.

Figure 14:
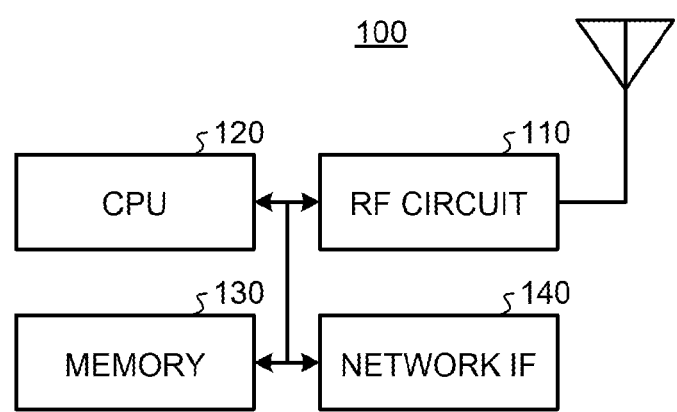
FIG. 14 is a diagram illustrating a hardware configuration of a base station.

FIG. 14 is a diagram illustrating a hardware configuration of a base station. As illustrated in FIG. 14, a base station 100 includes, as hardware components, an RF (Radio Frequency) circuit 110, a CPU (Central Processing Unit) 120, a memory 130, and a network IF (Inter Face) 140. The memory 130 is formed of, for example, a RAM such as an SDRAM (Synchronous Dynamic Random Access Memory), a ROM (Read Only Memory), or a flash memory. The communication processing unit 12, the counting unit 13, and the assigning unit 14 are implemented by an integrated circuit of the CPU 120 or the like. The wireless unit 11 is implemented by the RF circuit 110. The network IF 16 corresponds to the network IF 140.

Figure 15:
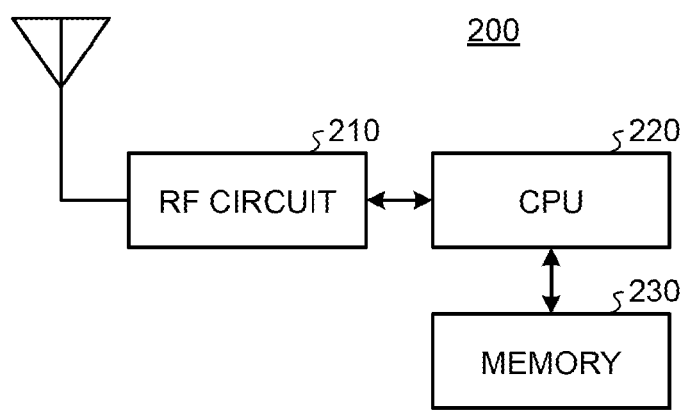
FIG. 15 is a diagram illustrating a hardware configuration of a terminal.

FIG. 15 is a diagram illustrating a hardware configuration of a terminal. As illustrated in FIG. 15, a terminal 200 includes, as hardware, an RF circuit 210, a CPU 220, and a memory 230. The memory 230 is formed of, for example, a RAM such as an SDRAM (Synchronous Dynamic Random Access Memory), a ROM (Read Only Memory), or a flash memory. The communication control unit 22 is implemented by an integrated circuit of the CPU 220 or the like. The wireless unit 21 is implemented by the RF circuit 210.

Various processes explained in the first to the fourth embodiments may be realized by causing a computer to execute a program prepared in advance. Specifically, programs corresponding to the processes executed by the communication processing unit 12, the counting unit 13, and the assigning unit 14 may be recorded in the memory 130, and the CPU 120 reads each of the programs so that the programs function as the processes. Furthermore, programs corresponding to various processes performed by the communication control unit 22 may be recorded in the memory 230, and the CPU 220 reads each of the programs so that the programs function as the processes.

Second Other Embodiment

The base stations of the first to the fourth embodiments are not limited to the femto base stations. For example, the base stations may be macro base stations, third-generation base stations, or LTE-based base stations. Namely, the above embodiments can be applied to any types of base stations.

According to an embodiment disclosed herein, it is possible to improve the use efficiency of a cell assigned to any of communication carriers.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
    a memory; and
    a processor coupled to the memory, wherein the processor executes a process comprising:
        counting number of terminals located in an area covered by the base station, for each of communication carriers, the communication carriers including a first communication carrier and a second communication carrier whose priority is lower than priority of the first communication carrier;
        assigning each of a plurality of cells to any of the communication carriers based on the counted number of terminals, wherein each of the plurality of cells is a frequency band of the base station;
        determining whether a shared cell is included in the plurality of cells, the shared cell being a cell that is available to all of the communication carriers;
        when the shared cell is included in the plurality of cells, assigning the shared cell to the first communication carrier to increase number of cells assigned to the first communication carrier; and
        when the shared cell is not included in the plurality of cells, assigning a cell that is assigned to the second communication carrier to the first communication carrier to increase the number of cells assigned to the first communication carrier.

2. The base station according to claim 1, wherein a lower limit of the number of cells assigned to each of the communication carriers is set.

3. The base station according to claim 1, wherein the assigning includes:
    assigning a second number of cells to a certain communication carrier when the second number of cells assigned at current assignment is greater than a first number of cells assigned at previous assignment and when a throughput of the certain communication carrier or a cumulative number of packets of the certain communication carrier in a certain period is smaller than a certain value, the second number of cells being the greater number than the first number of cells, and
    assigning the first number of cells to the certain communication carrier when the throughput or the cumulative number of packets is equal to or greater than the certain value.

4. The base station according to claim 1, wherein the counting includes counting the number based on a tracking area registration request transmitted by each of the terminals or based on a response transmitted by each of the terminals in response to a paging signal transmitted by the base station.

5. A cell assignment method comprising:
    counting number of terminals located in an area covered by a base station, for each of communication carriers, the communication carriers including a first communication carrier and a second communication carrier whose priority is lower than priority of the first communication carrier;
    assigning each of a plurality of cells to any of the communication carriers based on the counted number of terminals, wherein each of the plurality of cells is a frequency band of the base station;
    determining whether a shared cell is included in the plurality of cells, the shared cell being a cell that is available to all of the communication carriers;
    when the shared cell is included in the plurality of cells, assigning the shared cell to the first communication carrier to increase number of cells assigned to the first communication carrier; and
    when the shared cell is not included in the plurality of cells, assigning a cell that is assigned to the second communication carrier to the first communication carrier to increase the number of cells assigned to the first communication carrier.

* * * * *